(12) United States Patent
Lange et al.

(10) Patent No.: US 12,113,352 B2
(45) Date of Patent: Oct. 8, 2024

(54) PROTECTION APPARATUS FOR A LOAD RESISTOR, AND METHOD FOR OPERATING SUCH A PROTECTION APPARATUS

(71) Applicant: Siemens Aktiengesellschaft, Munich (DE)

(72) Inventors: Robert Lange, Crimmitschau (DE); Marco Seja

(73) Assignee: Siemens Aktiengesellschaft, Munich (DE)

( * ) Notice: Subject to any disclaimer, the term of this patent is extended or adjusted under 35 U.S.C. 154(b) by 232 days.

(21) Appl. No.: 17/764,886

(22) PCT Filed: Aug. 6, 2020

(86) PCT No.: PCT/EP2020/072093
§ 371 (c)(1),
(2) Date: Mar. 29, 2022

(87) PCT Pub. No.: WO2021/063569
PCT Pub. Date: Apr. 8, 2021

(65) Prior Publication Data
US 2022/0393458 A1    Dec. 8, 2022

(30) Foreign Application Priority Data
Sep. 30, 2019 (EP) .................... 19200374

(51) Int. Cl.
*H02H 7/085* (2006.01)
*H02H 1/00* (2006.01)

(52) U.S. Cl.
CPC .......... *H02H 7/085* (2013.01); *H02H 1/0007* (2013.01)

(58) Field of Classification Search
CPC ...... H02H 1/0007; H02H 3/023; H02H 7/085; H02H 7/12; H02H 9/001; H02H 9/042;
(Continued)

(56) References Cited

U.S. PATENT DOCUMENTS

| 7,459,888 | B2 * | 12/2008 | Schulte ................ B60L 50/62 320/167 |
| 8,729,864 | B2 * | 5/2014 | Dittmer ................ B60L 3/0053 320/136 |
| 2011/0006726 | A1 | 1/2011 | Dittmer et al. |

FOREIGN PATENT DOCUMENTS

| CN | 103155397 A | 6/2013 |
| CN | 203434898 U | 2/2014 |

(Continued)

OTHER PUBLICATIONS

PCT International Search Report and Written Opinion of International Searching Authority mailed Sep. 2, 2021 corresponding to PCT International Application No. PCT/ EP2020/072093 filed Aug. 6, 2020.

*Primary Examiner* — Jared Fureman
*Assistant Examiner* — Nicolas Bellido
(74) *Attorney, Agent, or Firm* — Henry M. Feiereisen LLC

(57) ABSTRACT

A protection apparatus for operating an electric machine at a converter comprises a first and second conductor of a DC link, a switching device having a first and second switch, a link capacitor, a load resistor as a precharge and braking resistor, a semiconductor switch and an electrical fuse for protecting the load resistor. The electrical fuse and the first switch are connected in series to the first conductor and to a first resistor connection of the load resistor and to a first power connection of the semiconductor switch. The second switch is connected to the electrical conductor and to a first capacitor connection of the link capacitor and to a second (Continued)

resistor connection of the load resistor. The semiconductor switch is connected by a second power connection to the second conductor and the link capacitor is connected by a second capacitor connection to the second conductor.

15 Claims, 4 Drawing Sheets

(58) Field of Classification Search
CPC .......... H02M 7/48; H02P 27/00; H02P 27/06; H02P 3/22; B60L 7/22
See application file for complete search history.

(56) References Cited

FOREIGN PATENT DOCUMENTS

| | | | | |
|---|---|---|---|---|
| CN | 205882731 U | 1/2017 | | |
| CN | 206727923 U | 12/2017 | | |
| CN | 207565514 U | * 7/2018 | | |
| CN | 109039170 A | 12/2018 | | |
| CN | 109421545 A | 3/2019 | | |
| CN | 109552056 A | 4/2019 | | |
| DE | 102007047713 A1 | 4/2009 | | |
| DE | 102016206053 A1 | * 11/2016 | ............ | B60L 15/007 |
| EP | 740407 A2 | * 10/1996 | ................ | H02P 3/12 |
| EP | 1818207 A2 | 8/2007 | | |
| JP | 08-340687 A | * 12/1996 | | |
| JP | H08340687 A | 12/1996 | | |
| JP | 2011062035 A | 3/2011 | | |

* cited by examiner

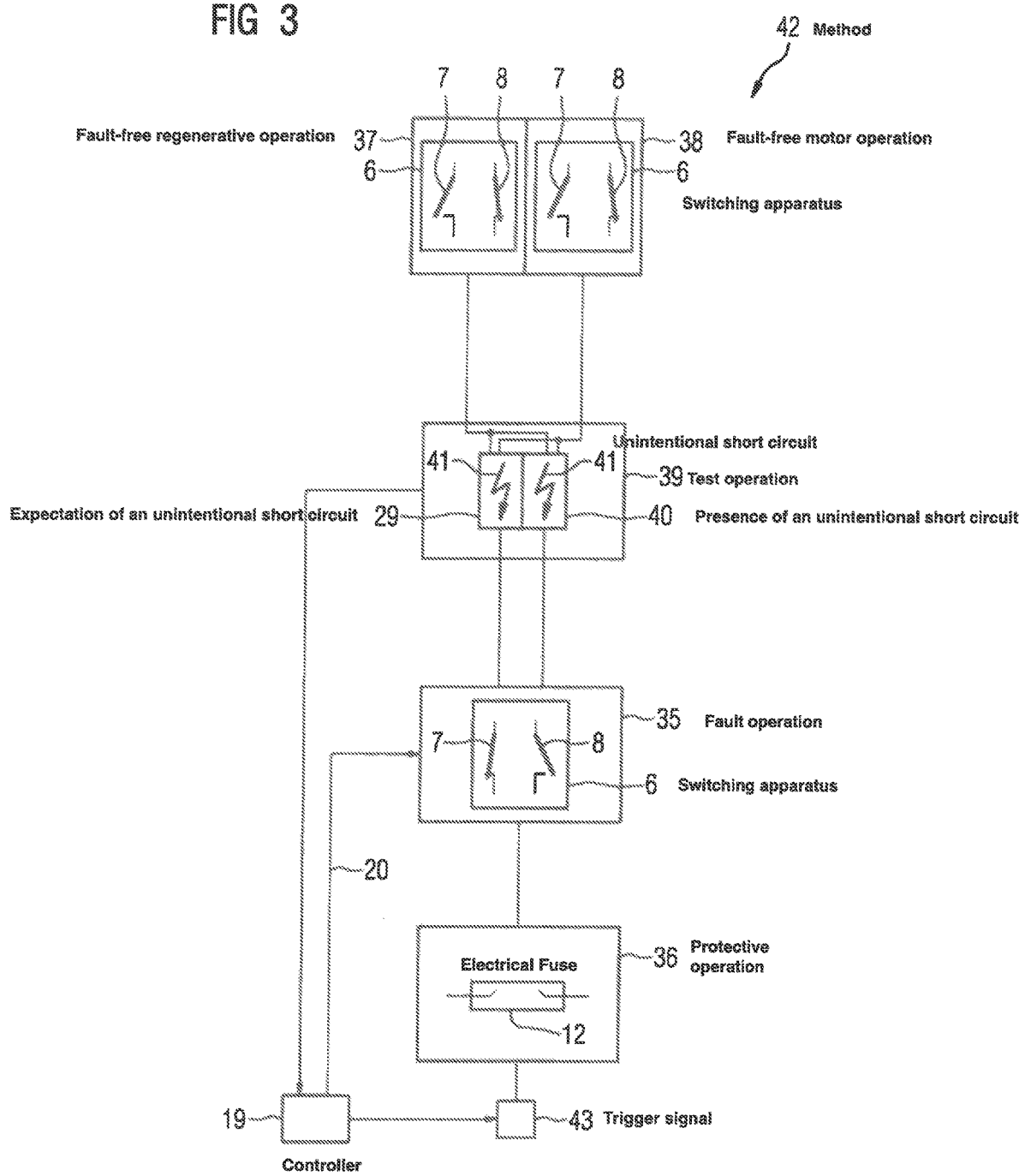

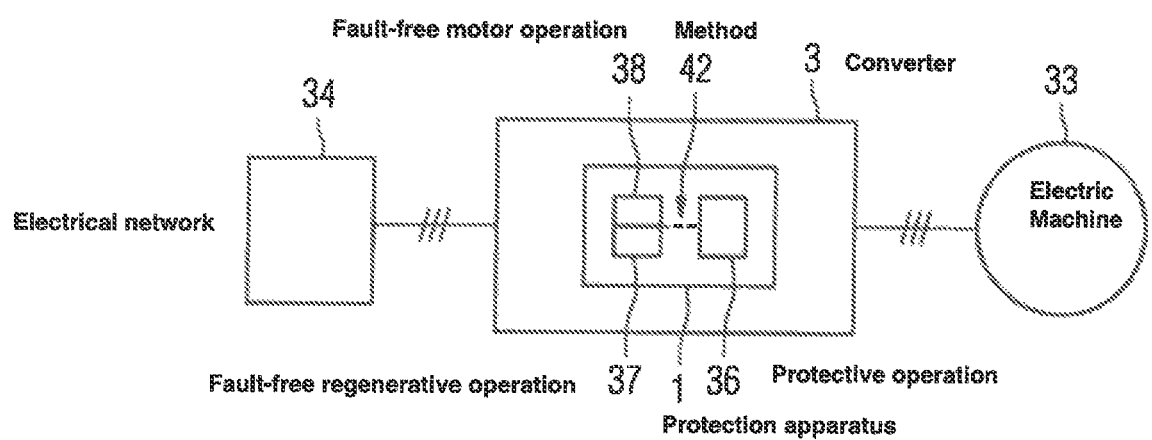

PROTECTION APPARATUS FOR A LOAD RESISTOR, AND METHOD FOR OPERATING SUCH A PROTECTION APPARATUS

CROSS-REFERENCES TO RELATED APPLICATIONS

This application is the U.S. National Stage of International Application No. PCT/EP2020/072093 filed Aug. 6, 2020, which designated the United States and has been published as International Publication No. WO 2021/063569 and which claims the priority of European Patent Application, Serial No. 19200374,7 filed Sep. 30, 2019, pursuant to 35 U.S.C. 119(a)-(d).

BACKGROUND OF THE INVENTION

The invention relates to a protection apparatus for operating an electric machine on a converter, the protection apparatus protecting a load resistor which can be operated as a braking resistor during regenerative braking by means of a semiconductor switch and which can be used as a precharge resistor for precharging an intermediate capacitor on a DC voltage intermediate circuit.

Electrical converters, which are also used in particular in industrial environments in safety-relevant drive systems, must assume a safe operating state in the event of a fault and may only be put back into operation once the fault has been rectified.

Due to the type of construction or due to network specifications of the electrical supply network, not every converter is able to feed back electrical energy which is generated by an electrical machine operated by the converter during braking operation, for example, into an electrical network.

In order to neutralize this regenerative excess electrical energy without damage to the converter, a braking resistor is generally used on the DC voltage intermediate circuit of the converter. This braking resistor converts electrical energy into thermal energy which is emitted into the environment by the braking resistor.

If the full regenerative power is to be absorbed by the braking resistor during the braking operation and converted into thermal energy, the braking resistor can be designed accordingly based on the required performance data. However, this is a very expensive solution requiring space with regard to the braking resistor.

Another known solution is for the braking resistor to absorb the excess electrical energy in a metered manner by means of a clocked semiconductor switch and to gently convert this electrical energy into thermal energy for the braking resistor. Metering of the conversion of electrical energy into thermal energy is therefore used so as not to overload the braking resistor and to protect it from destruction. This solution is also known as a braking resistor with a brake chopper (here a semiconductor switch).

During operation of the semiconductor switch actuated in a clocked manner, for metered control of the braking resistor for absorbing and converting the regenerative electrical energy into thermal energy, the semiconductor switch may fail in the event of a fault. This means that the semiconductor switch remains permanently closed in its drain-source path or collector-emitter path, i.e., the power path, despite the opening command. Accordingly, there is then an unintentional short circuit at the semiconductor switch.

Since the presence or expectation of an unintentional short circuit at the semiconductor switch means that the braking resistor can no longer absorb electrical energy in a metered manner, this fault generally leads to massive, destructive heat development at the braking resistor. This is associated with corresponding risks to machines and people. After such a development of heat, the braking resistor is usually destroyed and a new braking resistor, which is still very expensive even with this solution, is required.

Often the braking resistor in converters also has the task of precharging an intermediate circuit capacitor on the DC voltage intermediate circuit in a metered manner as a precharge resistor in order not to destroy the intermediate circuit capacitor during the precharging process. The protection of the braking resistor therefore also serves to protect it in its function as a precharge resistor.

As the braking resistor is an electrical load both in its function of electrical braking and in its function as a precharge resistor, the term load resistor, which is also used for the combination of the function of braking resistor and precharge resistor, is introduced here.

The object of the invention is therefore to propose a protection apparatus, a method for the protection apparatus and a converter with the protection apparatus, by means of which a load resistor used in operation as a braking and precharge resistor is better protected against damage or destruction than known solutions.

SUMMARY OF THE INVENTION

The object is achieved by a protection apparatus as set forth hereinafter, by a method for operating the protection apparatus as set forth hereinafter, and by a converter having the protection apparatus and the method for its operation as set forth hereinafter.

To achieve the object, a protection apparatus for operating an electric machine on a converter is proposed, which comprises a first and a second conductor of a DC voltage intermediate circuit, a switching apparatus having a first and second switch, an intermediate circuit capacitor, a load resistor as a precharge and braking resistor, a semiconductor switch and an electrical fuse for protecting the load resistor, wherein the electrical fuse and the first switch are electrically connected in series to the first conductor on one side, and to a first resistor connection of the load resistor and a first power connection of the semiconductor switch on the other side, wherein the second switch is electrically connected, on one side, to the first conductor and, on the other side, to a first capacitor connection of the intermediate circuit capacitor and a second resistor connection of the load resistor, and wherein the semiconductor switch is electrically connected to the second conductor by means of a second power connection and the intermediate circuit capacitor is electrically connected to the second conductor by means of a second capacitor connection.

The protection apparatus is used advantageously if the load resistor is provided both for electrical braking, that is to say the energy conversion of regenerative electrical energy into thermal energy by means of the semiconductor switch (of the brake chopper), as well as for precharging the intermediate circuit capacitor on the DC voltage intermediate circuit.

The protection apparatus is active during fault-free regenerative or motor operation of the converter. The electrical fuse is arranged as a protective element for the load resistor and the protection apparatus is designed in such a way that when an unintentional short circuit is detected at the semiconductor switch, the electrical fuse is tripped in a force-actuated manner, with electrical energy then no longer being able to flow through the load resistor and the latter thus being protected from destruction.

As already mentioned, by means of the protection apparatus, in particular by means of the load resistor of the protection apparatus, the intermediate circuit capacitor can also be precharged in an advantageous combinatorial manner, wherein the protection apparatus can also be active in this operating state and the electrical fuse can be tripped in a force-actuated manner when the failed semiconductor switch is detected.

Advantageous embodiments of the protection apparatus are specified in the dependent claims.

In a first advantageous embodiment of the protection apparatus, the first switch and the second switch form an alternating circuit and the first switch is closed when the second switch is open, or the first switch is open when the second switch is closed.

It is advantageously ensured here that when the switches are actuated, both switches assume a clearly defined switching state, wherein in particular when the electrical fuse is tripped, the intermediate circuit capacitor is no longer supplied with electrical energy and can discharge.

In a further advantageous embodiment of the protection apparatus, a controller is provided, wherein the first switch and the second switch can be switched by means of a switching command which can be generated by the controller.

The controller advantageously takes over the safe actuation of the switches by means of the control command, the controller being able to determine the presence or expectation of the unintentional short circuit at the semiconductor switch and trip the electrical fuse for protecting the load resistance by issuing the switching command to the switches.

In a further advantageous embodiment of the protection apparatus, a first temperature detector is provided, which is arranged on the load resistor, a resistance temperature of the load resistor being able to be detected by means of the first temperature detector and transmitted to the controller as a first temperature signal.

The determined resistance temperature of the load resistor is advantageously a measure of whether the load resistor can still be operated or whether the resistance temperature is too high for safe operation of the load resistor, this information being made available to the controller by means of the first temperature signal for checking for the possible presence or expectation of the unintentional short circuit at the semiconductor switch.

In a further advantageous embodiment of the protection apparatus, a second temperature detector is provided, which is arranged at the semiconductor switch, a semiconductor temperature of the semiconductor switch being able to be detected by means of the second temperature detector and transmitted to the controller as a second temperature signal.

The determined semiconductor temperature of the semiconductor switch can advantageously be a measure of whether the semiconductor switch can still be operated or whether it poses a risk to the safe operation of the load resistor, this information being made available to the controller by means of the second temperature signal for checking for the possible presence or expectation of the unintentional short circuit at the semiconductor switch.

In a further advantageous embodiment of the protection apparatus, a voltage detector is provided, which is electrically connected in series to the first power connection of the semiconductor switch or in series to the second power connection of the semiconductor switch, a semiconductor output voltage of the semiconductor switch being able to be detected by means of the voltage detector and transmitted to the controller as a voltage signal.

The determined semiconductor output voltage (via drain-source connections or collector-emitter connection) of the semiconductor switch can advantageously be a measure of whether the semiconductor switch can still be operated or whether it poses a risk to the safe operation of the load resistor, with this information being made available to the controller by means of the voltage signal for checking for the possible presence or expectation of the unintentional short circuit at the semiconductor switch.

In a further advantageous embodiment of the protection apparatus, a current detector is provided, which is electrically connected between the first power connection of the semiconductor switch and the second resistor connection of the load resistor or between the second power connection of the semiconductor switch and the second conductor of the DC voltage intermediate circuit, with a semiconductor output current of the semiconductor switch being able to be detected by means of the current detector and transmitted to the controller as a current signal.

The determined semiconductor output current (in the drain-source path or the collector-emitter path) of the semiconductor switch can advantageously be a measure of whether the semiconductor switch can still be operated or whether it poses a risk to the safe operation of the load resistor, this information being made available to the controller by means of the current signal for checking for the possible presence or expectation of the unintentional short circuit at the semiconductor switch.

In a further advantageous embodiment of the protection apparatus, an actuation detector is provided, an actuation command for a control connection of the semiconductor switch being able to be detected by means of the actuation detector and transmitted to the controller as an actuation signal.

The actuation command for the control connection (the gate) of the semiconductor switch, that is to say the status of whether an open command or a close command is pending at the semiconductor switch, can in particular together with the information about the semiconductor output voltage and/or the information about the semiconductor output current, advantageously be a measure of whether the semiconductor switch can still be operated or whether it poses a risk to the safe operation of the load resistor, this information being made available to the controller by means of the actuation signal for checking for the possible presence or expectation of the unintentional short circuit at the semiconductor switch.

To achieve the object, furthermore a method for operating a protection apparatus according to the invention is also proposed, wherein in fault-free regenerative operation of a converter, when braking an electric machine by means of the load resistor and the semiconductor switch, or in fault-free motor operation of the converter, when the electric machine is driven by means of the intermediate circuit capacitor, the first switch of the switching apparatus is open and the second switch of the switching apparatus is closed, wherein in test operation the semiconductor switch is checked for the presence or expectation of an unintentional short circuit, wherein in fault operation, when the unintentional short circuit of the semiconductor switch is present or expected, the first switch is closed and the second switch is opened and wherein, in protective operation, the electrical fuse for protecting the load resistor is tripped.

Based on fault-free regenerative or motor operation of the converter, in which the first switch is open, and the second switch is closed, test operation is carried out in an advantageous manner of the method in parallel with fault-free regenerative or motor operation. The presence or expectation of the unintentional short circuit leads to fault operation. The expectation of the unintentional short circuit means that this unintentional short circuit is imminent if regenerative or motor operation is continued.

In fault operation, the switches are switched as an active action, with the electrical fuse for protecting the load resistor being tripped as a result of the closing of the first switch and the opening of the second switch in protective operation, and a safe operating state being established by means of the protection apparatus for the converter.

In a first advantageous embodiment of the method, the switches are switched, when the unintentional short circuit is present or expected, by means of the switching command from the controller and a trigger signal for tripping the electrical fuse is generated.

In a further advantageous embodiment of the method, the presence or expectation of the unintentional short circuit is determined by the controller on the basis of the resistance temperature of the load resistor.

The resistance temperature of the load resistor is a measure of whether the load resistor can still be operated or whether the resistance temperature is too high for safe operation of the load resistor. The controller therefore uses the resistance temperature to advantageously determine the presence or expectation of the unintentional short circuit and whether the protection of the load resistor must be activated by means of the electrical fuse.

In a further advantageous embodiment of the method, the presence or expectation of the unintentional short circuit is determined by the controller on the basis of the semiconductor temperature of the semiconductor switch.

The semiconductor temperature of the semiconductor switch is a measure of whether the semiconductor switch can still be operated or poses a risk to the safe operation of the load resistor. The controller therefore uses the semiconductor temperature to advantageously determine the presence or expectation of the unintentional short circuit and whether the protection of the load resistor must be activated by means of the electrical fuse.

In a further advantageous embodiment of the method, the presence or expectation of the unintentional short circuit is determined by the controller on the basis of the actuation command for the control connection of the semiconductor switch and the semiconductor output voltage of the semiconductor switch.

The semiconductor output voltage of the semiconductor switch is a measure of whether the semiconductor switch can still be operated or poses a risk to the safe operation of the load resistor. By means of the semiconductor output voltage and the actuation command for the control connection of the semiconductor switch, the controller therefore advantageously determines the presence or expectation of the unintentional short circuit and whether the protection of the load resistor must be activated by means of the electrical fuse.

In a further advantageous embodiment of the method, the presence or expectation of the unintentional short circuit is determined by the controller on the basis of the actuation command for the control connection of the semiconductor switch and the semiconductor output current of the semiconductor switch.

The semiconductor output current of the semiconductor switch is a measure of whether the semiconductor switch can still be operated or poses a risk to the safe operation of the load resistor. By means of the semiconductor output current and the actuation command for the control connection of the semiconductor switch, the controller therefore advantageously determines the presence or expectation of the unintentional short circuit and whether the protection of the load resistor must be activated by means of the electrical fuse.

To achieve the object, a converter with a protection apparatus according to the invention is also proposed, wherein the protection apparatus can be operated using a method according to the invention, wherein by means of the converter the electric machine can be operated on an electrical network, and wherein in protective operation the regenerative or motor operation of the converter and the precharging of the intermediate circuit capacitor of the converter can be blocked by means of the protection apparatus after tripping of the electrical fuse.

BRIEF DESCRIPTION OF THE DRAWING

The properties, features and advantages of this invention described above, and the manner in which they are achieved, will become clearer and more readily comprehensible in connection with the following description of the exemplary embodiments which are described in more detail in connection with the figures, in which:

FIG. 3 shows a structure chart of a method for the operation of the protection apparatus according to FIG. 1 or FIG. 2 and FIG. 4 shows a schematic representation of a converter with a protection apparatus and a method for the protection apparatus, it being possible to operate an electric machine on an electrical network by means of the converter.

DETAILED DESCRIPTION OF PREFERRED EMBODIMENTS

Figure 1:
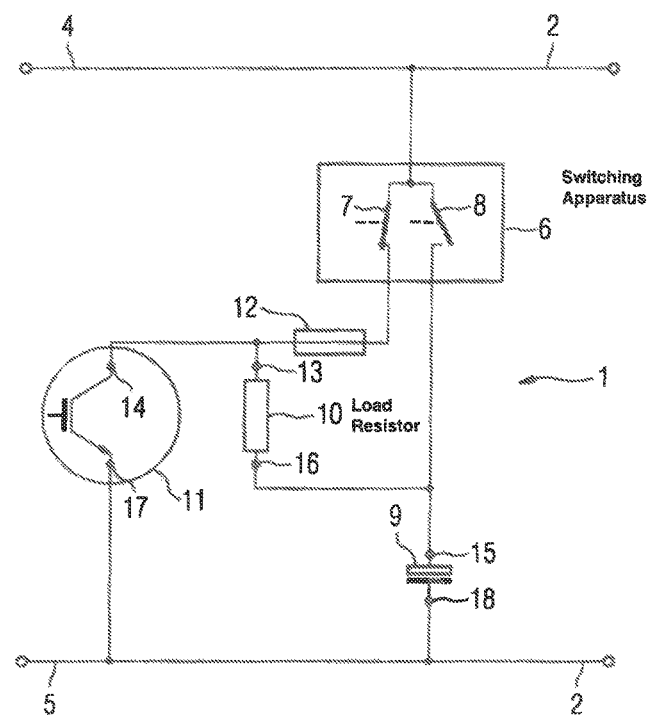
FIG. 1 shows a first schematic representation of a protection apparatus according to the invention.

FIG. 1 shows a first schematic representation of a protection apparatus 1 according to the invention.

A DC voltage intermediate circuit 2 has a first conductor 4 and a second conductor 5.

An electrical fuse 12 and a first switch 7 of a switching apparatus 6 are electrically connected in series to the first conductor 4 on one side and to a first resistor connection 13 of a load resistor 10 and to a first power connection 14 of a semiconductor switch 11 on the other side.

A second switch 8 is electrically connected to the first conductor 4 on one side and to a first capacitor connection 15 of an intermediate circuit capacitor 9 and to a second resistor connection 16 of the load resistor 10 on the other side.

The semiconductor switch 11 is electrically connected to the second conductor 5 by means of a second power connection 17, and the intermediate circuit capacitor 9 is electrically connected to the second conductor 5 by means of a second capacitor connection 18.

To precharge the intermediate circuit capacitor 9, as shown in FIG. 1, the first switch 7 of the switching apparatus 6 is closed and the second switch 8 of the switching apparatus 6 is open. The intermediate circuit capacitor 9 can be precharged via the DC voltage intermediate circuit 2, the first conductor 4, the closed first switch 7, the electrical fuse 12, the load resistor 10, the intermediate circuit capacitor 9 and the second conductor 5.

In the case of regenerative or motor operation of the protection apparatus 1, the first switch 7 of the switching apparatus 6 is open and the second switch 8 of the switching apparatus 6 is closed (switching states are not shown in FIG. 1). In regenerative operation, the electrical energy from the DC voltage intermediate circuit 2 can be converted into thermal energy via the first conductor 4, the closed second switch 8 (closed switching state not shown in FIG. 1), the load resistor 10, the semiconductor switch 11 and the second conductor 5 by means of the load resistor 10 and the semiconductor switch 11 at the load resistor 10.

It is also possible to feed electrical energy into the intermediate circuit capacitor 9 in regenerative operation, provided its charging capacity still makes this possible, this being performed via the first conductor 4, the closed second switch 8 (closed switching state not shown in FIG. 1), the intermediate circuit capacitor 9 to be charged and the second conductor 5.

The motor operation of the protection apparatus 1 likewise takes place via the closed second switch 8 (closed switching state in FIG. 1 not shown). The intermediate circuit capacitor 9 electrically connected in this way to the DC voltage intermediate circuit 2 then ensures, inter alia, that the level of the DC voltage is as constant as possible and is smoothed.

Figure 2:
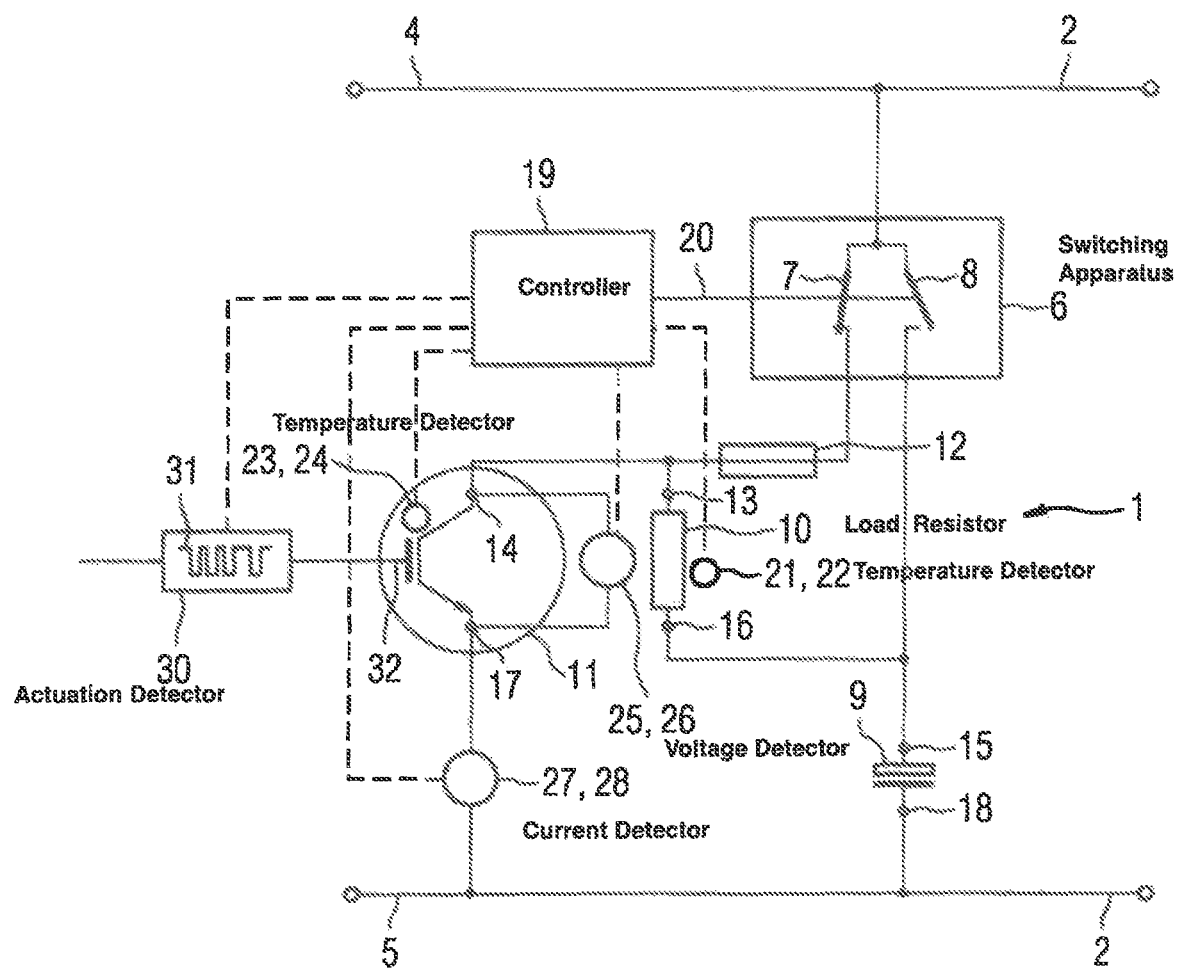
FIG. 2 shows a second schematic representation of the protection apparatus according to FIG. 1 with a controller.

FIG. 2 shows a second schematic representation of the protection apparatus 1 according to FIG. 1.

A controller 19 can generate a control command 20 by means of which the first switch 7 and the second switch 8 of the switching apparatus 6 can be switched.

A resistance temperature 22 of the load resistor 10 can be detected by means of a first temperature detector 21 and can be transmitted to the controller 19 as a first temperature signal.

A semiconductor temperature 24 of the semiconductor switch 11 can be detected by means of a second temperature detector 23 and can be transmitted to the controller 20 as a second temperature signal.

A semiconductor output voltage 26 of the semiconductor switch 11 can be detected by means of a voltage detector 25, connected to a first and a second power connection 14,17 of the semiconductor switch 11, and can be transmitted to the controller 19 as a voltage signal.

By means of a current detector 27, which is electrically connected in series to the first power connection 14 of the semiconductor switch 11, between the first power connection 14 of the semiconductor switch 11 and the second conductor 5, a semiconductor output current 28 of the semiconductor switch 11 can be detected and transmitted to the controller 19 as a current signal.

By means of an actuation detector 30, an actuation command 31 for a control connection 32 of the semiconductor switch 11 can be detected and can be transmitted to the controller 19 as an actuation signal.

FIG. 3 shows a structure chart of a method 42 for operating the protection apparatus 1 according to FIG. 1 or FIG. 2.

In fault-free regenerative operation 37 of a converter, when braking an electric machine by means of the load resistor and the semiconductor switch or in fault-free motor operation 38 of the converter, when the electric machine is driven by means of the intermediate circuit capacitor, the first switch 7 of the switching apparatus 6 is open and the second switch 8 of the switching apparatus 6 is closed.

In test operation 39, the semiconductor switch 11 is checked for the presence 40 or expectation 29 of an unintentional short circuit 41 both in regenerative operation 37 and in motor operation 38.

In fault operation 35, in the presence 40 or expectation 29 of the unintentional short circuit 41 of the semiconductor switch 11, the first switch 7 is closed and the second switch 8 is opened.

In protective operation 36, the electrical fuse 12 for protecting the load resistor is tripped.

When the unintentional short circuit 41 is present 40 or expected 29, the switches 7,8 are switched by means of the switching command 20 from the controller 19. A trigger signal 43 for tripping the electrical fuse 7 is generated by the controller 19.

FIG. 4 visualizes a schematic representation of a converter 3 with a protection apparatus 1 and a method 42 for the protection apparatus 1.

An electric machine 33 can be operated on an electrical network 34 by means of the converter 3. The electrical connections of the converter to the electrical network 34 and the electric machine 33 are shown here, by way of example, by means of three-phase conductor systems.

In protective operation 36, the regenerative or motor operation 37,38 of the converter 3 and the precharging of the intermediate circuit capacitor of the converter can be blocked by means of the protection apparatus 1 after the electrical fuse 12 has been tripped.

What is claimed is:

1. A protection apparatus of a converter for operating an electric machine, said protection apparatus comprising:
    a DC link including a first conductor and a second conductor;
    a switching apparatus having a first switch and second switch;
    a link capacitor;
    a load resistor functioning as a combination of a precharge resistor and a braking resistor;
    a semiconductor switch; and
    an electrical fuse for protecting the load resistor,
    wherein the electrical fuse and the first switch are electrically connected in series to the first conductor on one side of a series connection formed by the electrical fuse and the first switch, and electrically connected to a first resistor connection of the load resistor and to a first power connection of the semiconductor switch on another side of the series connection,
    wherein the second switch is electrically connected to the first conductor on one side of the second switch and to a first capacitor connection of the link capacitor and to a second resistor connection of the load resistor on another side of the second switch, and
    wherein the second conductor is electrically connected to a second power connection of the semiconductor switch and to a second capacitor connection of the link capacitor.

2. The protection apparatus of claim 1, further comprising an alternating circuit formed from the first switch and the second switch, wherein the first switch is closed when the second switch is open, or the first switch is open when the second switch is closed.

3. The protection apparatus of claims 1, further comprising a controller, said controller generating a control command for switching the first switch and the second switch.

4. The protection apparatus of claim 3, further comprising a first temperature detector arranged at the load resistor, said first temperature detector detecting a resistance temperature of the load resistor as a first temperature signal and transmitting the first temperature signal to the controller.

5. The protection apparatus of claim 3, further comprising a second temperature detector arranged at the semiconductor switch, said second temperature detector detecting a semiconductor temperature of the semiconductor switch as a second temperature signal and transmitting the second temperature signal to the controller.

6. The protection apparatus of claim 3, further comprising a voltage detector electrically connected to the first power connection and the second power connection of the semiconductor switch, said voltage detector detecting a semiconductor output voltage of the semiconductor switch as a voltage signal and transmitting the voltage signal to the controller.

7. The protection apparatus of claim 3, further comprising a current detector electrically connected in series either to the first power connection of the semiconductor switch or in series to the second power connection of the semiconductor switch, said current detector detecting a semiconductor output current of the semiconductor switch as a current signal and transmitting the current signal to the controller.

8. The protection apparatus of claim 3, further comprising an actuation detector detecting an actuation command for a control connection of the semiconductor switch as an actuation signal and transmitting the actuation signal to the controller.

9. A method for operating the protection apparatus as set forth in claim 1, said method comprising:
opening the first switch of the switching apparatus and closing the second switch of the switching apparatus in fault-free regenerative operation of the converter when braking the electric machine by the load resistor and the semiconductor switch, or in fault-free motor operation of the converter when the electric machine is driven by the link capacitor;
checking for a presence of or an expectation of an unintentional short circuit of the semiconductor switch in test operation;
closing the first switch and opening the second switch in fault operation when the unintentional short circuit of the semiconductor switch is present or expected; and
tripping the electrical fuse for protecting the load resistor in protective operation.

10. The method claimed of claim 9, further comprising switching the switches when the unintentional short circuit is present or expected by a switching command from a controller and a trigger signal for tripping the electrical fuse is generated.

11. The method of claim 9, further comprising determining the presence or expectation of the unintentional short circuit by a controller based on a resistance temperature of the load resistor.

12. The method of claim 9, further comprising determining the presence or expectation of the unintentional short circuit by a controller based on a semiconductor temperature of the semiconductor switch.

13. The method of claim 9, further comprising determining the presence or expectation of the unintentional short circuit by a controller based on an actuation command for a control connection of the semiconductor switch and a semiconductor output voltage of the semiconductor switch.

14. The method of claim 9, further comprising determining the presence or expectation of the unintentional short circuit by a controller based on an actuation command for a control connection of the semiconductor switch and a semiconductor output current of the semiconductor switch.

15. The converter, comprising:
the protection apparatus operated by the method set forth in claim 9 for operating the electric machine, said protection apparatus comprising the DC link including the first conductor and the second conductor, the switching apparatus including the first switch and second switch, the link circuit capacitor, the load resistor functioning as the combination of the precharge resistor and the braking resistor, the semiconductor switch, and the electrical fuse for protecting the load resistor, wherein the electrical fuse and the first switch are electrically connected in series to the first conductor on one side of a series connection, and electrically connected to the first resistor connection of the load resistor and to the first power connection of the semiconductor switch on another side of the series connection, wherein the second switch is electrically connected to the first conductor on one side of the second switch and to the first capacitor connection of the link capacitor and to the second resistor connection of the load resistor on another side of the second switch, and wherein the second conductor is electrically connected to the second power connection of the semiconductor switch and to the second capacitor connection of the link capacitor;
said converter being configured to operate the electric machine on an electrical network,
wherein in the protective operation, the fault-free regenerative or fault-free motor operation of the converter and precharging of the link capacitor of the protection apparatus are blocked by the protection apparatus after the electrical fuse has been tripped.

* * * * *